United States Patent [19]
Morris et al.

[11] Patent Number: 5,109,669
[45] Date of Patent: May 5, 1992

[54] PASSIVE SELF-CONTAINED AUTO IGNITION SYSTEM

[75] Inventors: Donald H. Morris, Agoura; Gary L. Briley, Chatsworth, both of Calif.

[73] Assignee: Rockwell International Corporation, El Segundo, Calif.

[21] Appl. No.: 647,521

[22] Filed: Nov. 19, 1990

Related U.S. Application Data

[63] Continuation-in-part of Ser. No. 413,899, Sep. 28, 1989, abandoned.

[51] Int. Cl.⁵ .............................................. F02K 9/95
[52] U.S. Cl. ................... 60/39.821; 102/380
[58] Field of Search .................... 60/39.77, 39.821; 102/205, 224, 380; 431/267

[56] References Cited

U.S. PATENT DOCUMENTS

| | | | |
|---|---|---|---|
| 3,630,150 | 12/1971 | Rakowsky | 102/224 |
| 3,811,359 | 5/1974 | Marchese | 102/380 |
| 3,854,401 | 12/1974 | Fisher | 102/224 |
| 3,982,488 | 9/1976 | Rakowsky et al. | 102/224 |
| 3,994,226 | 11/1976 | Rakowsky et al. | 102/224 |
| 3,994,232 | 11/1976 | Rakowsky et al. | 102/224 |
| 4,036,581 | 7/1977 | Keyser et al. | 431/267 |
| 4,916,904 | 4/1990 | Ramsaier et al. | 60/723 |

OTHER PUBLICATIONS

A Resonance Igniter for Hydrogen-Oxygen Combusters, Journal of Spacecraft and Rockets, vol. 7, pp. 620-622, May 1970, by Bert Phillips, Albert Pauli and E. William Conrad.

Space Shuttle Auxiliary Propulsion (APS) Ignition System, NASA CR-72972, J. R. Lauffer, May 1971, pp. 273-301.

Analytical and Experimental Study of Resonance Ignition Tubes, Dec. 1973, L. Stabinsky, pp. 13-39, NASA-CR-136934.

Primary Examiner—Stephen C. Bentley
Attorney, Agent, or Firm—H. Fredrick Hamann; Harry B. Field; Steven E. Kahm

[57] ABSTRACT

This invention relates to a passive self-contained auto ignition system for a hydrogen-oxygen fueled rocket engine. When the fuel for the engine is turned on, the gas pressure in the inlet tube 1 can be used to heat a small portion of the hydrogen in a resonance tube 4 and inject hot hydrogen into the combustion chamber 11 to ignite the hydrogen-oxygen fuel mixture. Once the ignition has started, the pressure in the combustion chamber changes the pressures in the resonance cavity 3, which then shuts off the resonance tubes' heating ability and so shuts off the ignition. If the fuel supply is shut off the engine is turned off and can be restarted by turning the hydrogen-oxygen supplies back on causing the resonance tube to re-ignite the engine.

3 Claims, 2 Drawing Sheets

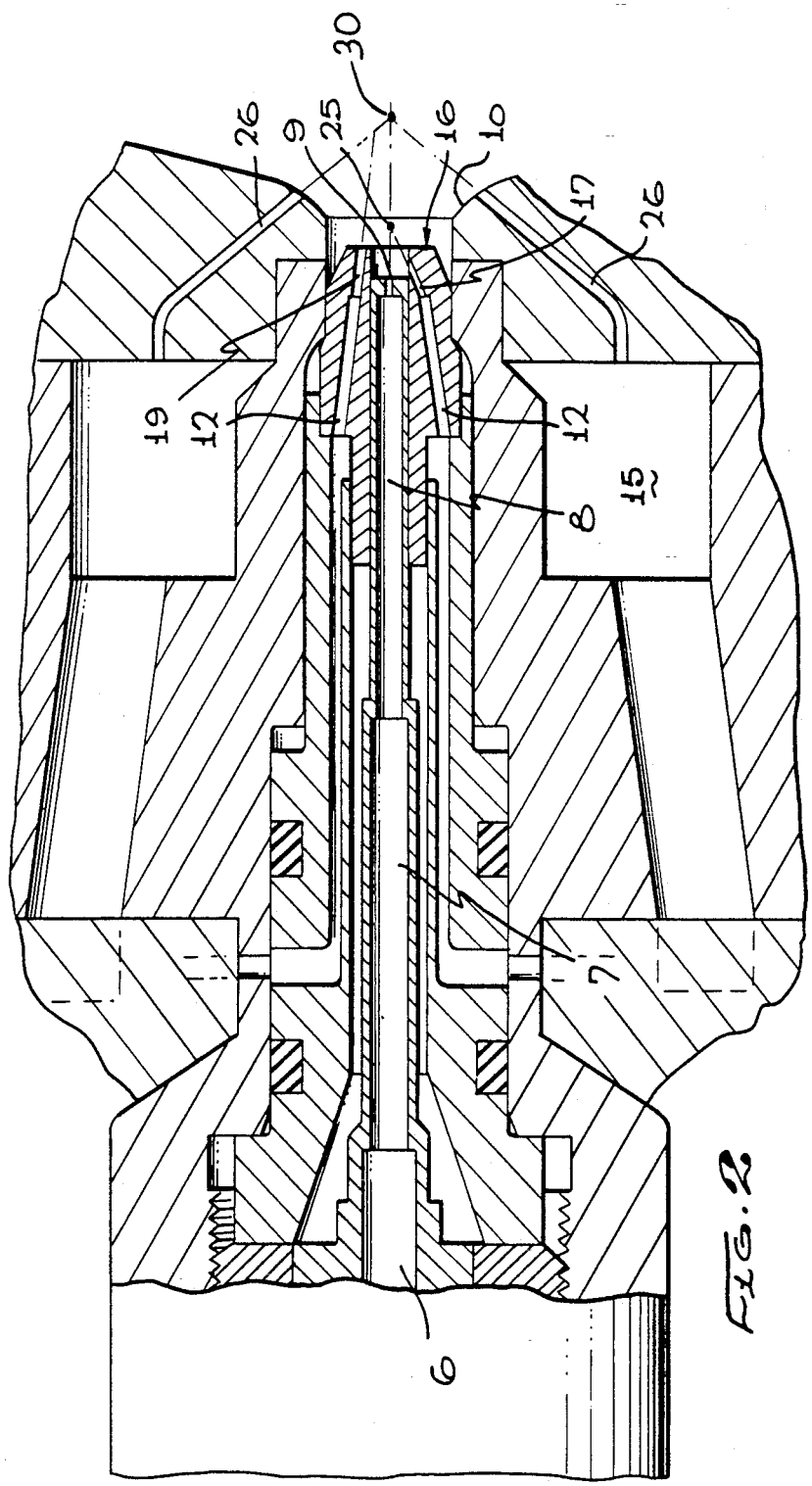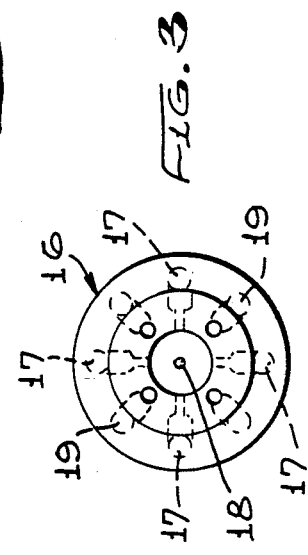

PASSIVE SELF-CONTAINED AUTO IGNITION SYSTEM

This is a continuation-in-part of copending application Ser. No. 07/413,899, filed on Sept. 28, 1989, now abandoned.

FIELD OF THE INVENTION

This invention relates to a means for heating hydrogen gas in a resonator to a temperature sufficient for ignition of a hydrogen-oxygen gas mixture in the combustion chamber of a rocket engine.

BACKGROUND OF THE INVENTION

In the past, various devices have been used for igniting the hydrogen oxygen mixture in the combustion chamber of a rocket engine. These devices generally employed a spark induced by an electrical current from a source of electricity and a means for sensing when to supply the spark and a timing mechanism. These systems tend to be complex, heavy, and are subject to failure, which can be disastrous for the rocket.

SUMMARY OF THE INVENTION

The invention uses a resonator driven by pressurized hydrogen gas to raise the hydrogen temperature and subsequently inject hot hydrogen into the ignition portion of a combustion chamber. The hot hydrogen is mixed with oxygen and ignites the mixture. More hydrogen and oxygen is added in the combustion chamber downstream of the ignition area, propagating the burning to the complete combustion chamber. The rocket once ignited will burn until either the hydrogen or oxygen supply is shut off.

After ignition, the chamber pressure builds and increases the pressure in the resonance tube removing the ability of the tube to resonate and to heat the hydrogen. Thus the ignition portion of the combustion chamber is off when the engine is on. If the engine is turned off re-ignition occurs by the reintroduction of hydrogen to the ignition portion through the resonace tube.

This design provides the rocket engine with a low cost, light weight, reliable automatic ignition system.

BRIEF DESCRIPTION OF THE DRAWINGS

FIG. 2 shows a cross sectional view of the resonance tube and nozzle.
FIG. 3 shows a front view of the nozzle plate.

DETAILED DESCRIPTION OF THE PREFERRED EMBODIMENT

Figure 1:
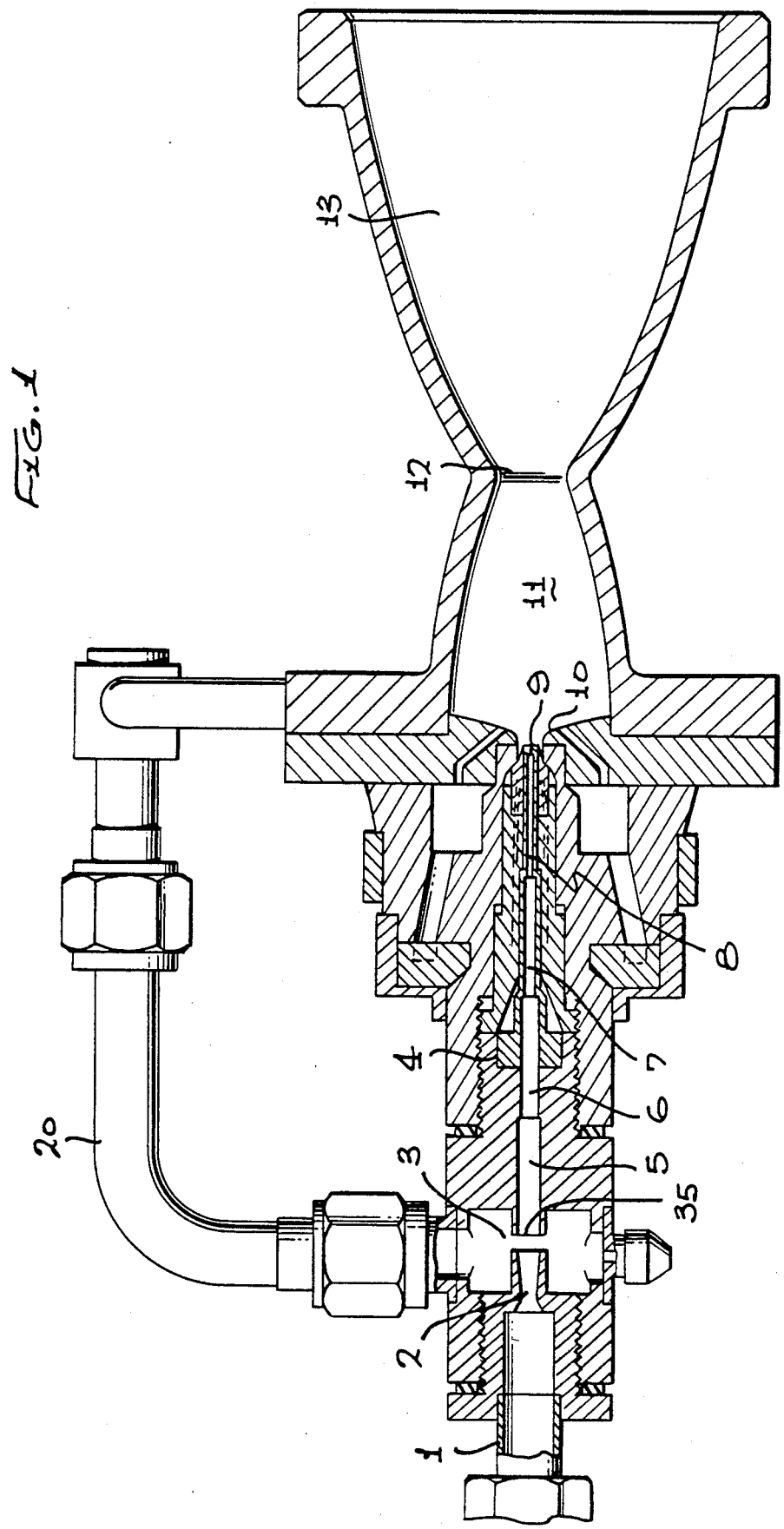
FIG. 1 shows a cross sectional view of the invention.

This invention relates to a rocket engine having a tube shaped for heating hydrogen by acoustic resonance within the tube. The hydrogen, heated to high temperatures by compression in the acoustic resonance process, ignites a hydrogen-oxygen fuel mixture in the combustion chamber of a rocket engine.

Viewing FIG. 1 from left to right there is an inlet tube 1 for supplying hydrogen through inlet nozzle 2 to the resonance cavity 3. The inlet nozzle is directly across the resonance cavity from the mouth 35 of the resonance tube 4. The resonance tube has four chambers 5, 6, 7 and 8 of decreasing diameter, culminating in a bleed orifice 9 which allows a small quantity of hot hydrogen to enter the combustion chamber 11 where it mixes with oxygen and ignites the mixture. More hydrogen and oxygen are added in the combustion chamber. The gas is ignited, passes through nozzle 12, and exits as expanding gases from chamber 13.

There are a number of factors to be considered to make the resonance tube perform properly. The pressure in the inlet tube 1, the shape and diameter of the inlet nozzle 2, the gap between the inlet nozzle 2 and the mouth 35, of the resonance tube 4, the size of the exhaust port 36, the diameters and lengths of the chambers 5, 6, 7 and 8 in the resonance tube, the size of the bleed orifice 9, and the pressure in the resonance cavity 3.

There is some latitude in establishing these parameters so the hydrogen will be heated to a temperature which will cause ignition. However the time to reach that temperature and the temperature reached will vary.

Either sonic nozzles or supersonic nozzles may be used with the resonance tube; however, the use of a supersonic nozzle produces a significantly higher and more predictable cavity temperature as a function of nozzle operating pressure ratio and is therefore preferred. Supersonic nozzles offer a marked improvement in the performance and operating range of the resonance tube.

Two supersonic nozzles have been tested. One had a 0.086 inch diameter throat, and a 0.149 inch exit. The second supersonic nozzle tested had a 0.068 inch diameter throat and a 0.131 inch exit. Both nozzles were 0.3 inches from throat to exit with a 6 degree slope nozzle wall. Both nozzles produced satisfactory results.

The nozzles were tested at inlet pressures of 100, 200 and 250 psig. A minimum of 100 psig should be used.

The operating ratio for best results is when the pressure of the inlet tube divided by the pressure in the resonance cavity is between 3.1 and 3.5 or greater.

The temperature of the hydrogen exiting from bleed orifice 9 must reach approximately a minimum of 840° F. to ignite the hydrogen-oxygen fuel mixture in the rocket engine. Times to reach this temperature are on the order of 25 milliseconds which will provide a quick start for the rocket engine after the fuel and oxidizer are turned on.

The preferred embodiment uses an inlet tube pressure of approximately 300 psia, a gap between the inlet nozzle 2 and the mouth 35 of the resonance tube 4 of 0.095 inches, a pressure of the inlet gas over pressure of the resonance cavity ratio of 3.2 or greater.

There is preferably a 0.297 inch exhaust port 36 in the resonance cavity 3. The resonance tube 4 is preferably composed of 4 chambers. The first chamber 5, having a diameter of 0.120 inches and a length of 0.750 inches. The second chamber 6 having a diameter of 0.094 inches and a length of 0.760 inches, a third chamber 7 having a diameter of 0.070 inches and a length of 0.760 inches and a fourth chamber 8 having a diameter of 0.047 inches and a length of 0.750 inches.

The bleed orifice 9 at the end of the fourth chamber has a diameter of 0.009 inches and extends through a 0.03 inch wall.

Once the engine is ignited the pressure in the engine's combustion chamber 11 creates a back pressure on the hydrogen in fuel supply tube 20, and though the bleed orifice 9 both of which are connected to the resonance cavity 3. This changes the pressure ratio of the pressure in the inlet tube to the resonance cavity and removes the ability of the resonance tube to produce hot enough hydrogen to ignite the hydrogen-oxygen fuel mixture. Therefore the ignition is shut off when the engine is on.

When the back pressure in resonance cavity 3 is raised because of combustion chamber ignition and operation, the shape of nozzle 2 allows sufficient pressure recovery to maintain a constant flow through nozzle 2, the rocket coolant circuit (not shown) and the rocket engine injector.

The engine ignition is started when hydrogen is injected into the engine from the inlet tube 1 to the resonance cavity 3. A resonance is set up in the resonance tube 4, hydrogen is also sent to the combustion chamber 11 through fuel supply tube 20, and through the combustion chamber coolant circuit (not shown) from resonance cavity 3.

As best seen in FIG. 2, hot hydrogen escaping from the bleed orifice 9 engages oxygen from the oxygen tube 12 which is adjacent to the resonance tube 4, and ignites a pilot flame in the region of resonance tube nozzle 10.

More hydrogen and oxygen is added to the combustion chamber and ignited by the pilot flame. There are many ways to add oxygen and hydrogen in various locations to produce efficient mixing and combustion. These various designs are beyond the scope of this disclosure. Here it is sufficient to note that once the engine is on the pressure in the combustion chamber shuts the ignition off.

Once ignited, the combustion will continue in the combustion chamber as long as the supply of hydrogen and oxygen is continued. When the hydrogen or oxygen supply is shut off the engine is shut off. The engine is restarted when the hydrogen and oxygen supply is turned on.

FIG. 3 shows a nozzle plate 16 which may be used on the tip of the resonance tube as shown in FIG. 2. In this embodiment hot hydrogen from bleed orifice 9 proceeds through the nozzle orifice 18 in nozzle plate 16 and is directed along the central axis of the nozzle to an ignition point 25 where the hot hydrogen is mixed with a stream of oxygen directed from oxygen tube 12 through orifice 17 in nozzle plate 16 to ignition point 25.

As seen in FIG. 3, there are preferably four orifice 17's in nozzle plate 16. Thus, small quantities of hydrogen and oxygen will mix at point 25 and ignition will occur in this region with the flame extending outward, away from the nozzle plate 13. Since this flame will be small, more hydrogen from hydrogen orifice 26 and more oxygen from nozzle orifice 19 are directed to ignition point 30 where the flame size is increased. Further downstream more hydrogen and oxygen are ignited to provide the main source of combustion for the engine.

It is preferred to have approximately a 20 to 1 ratio of oxygen to hydrogen by weight at ignition points 25 and 30 so that the hydrogen is in an oxygen rich atmosphere for ignition.

It should be understood that many other combinations of nozzles may be used with the resonator tube to provide ignition for the rocket engine.

What is claimed and desired to be secured by Letters Patent of the United States is:

1. A resonance tube ignition system for a rocket engine comprising,
    a supersonic nozzle, a resonance cavity, and a resonance tube having a mouth and a bleed orifice,
    wherein the supersonic nozzle is spaced across the resonance cavity from the mouth of the resonance tube and directs a gas flow of hydrogen into the resonance tube,
    the hydrogen is heated in the resonance tube, exits the bleed orifice and enters the combustion chamber as a central jet of hot hydrogen,
    a plurality of radial jets of oxygen are focused on the hydrogen entering the combustion chamber,
    the hot hydrogen ignites the hydrogen-oxygen mixture to form a pilot flame for igniting fuel in the combustition chamber of the rocket engine,
    the resonance cavity has an exit port and a tube connecting the exit port to the combustion chamber so that the increase in pressure in the combustion chamber when the engine is on will shut off the resonance ignition.

2. A resonance tube ignition system for a rocket engine as in claim 1 where a plurality of jets of hydrogen and oxygen are focused at a point downstream of the pilot flame to increase the size of the pilot flame.

3. A resonance ignition system for a rocket engine as in claim 1 wherein,
    the supersonic nozzle has a diverging nozzle section, which provides supersonic expansion prior to igniting the fuel and acts as a subsonic diffuser after ignition, the diverging nozzle section maintaining a constant flow of fuel through the nozzle before and after engine ignition.

* * * * *